US007980939B2

(12) United States Patent
Okada

(10) Patent No.: US 7,980,939 B2
(45) Date of Patent: Jul. 19, 2011

(54) GAMING APPARATUS AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1082 days.

(21) Appl. No.: 11/806,579

(22) Filed: Jun. 1, 2007

(65) Prior Publication Data

US 2008/0113724 A1 May 15, 2008

Related U.S. Application Data

(60) Provisional application No. 60/858,345, filed on Nov. 13, 2006.

(51) Int. Cl.
*G06F 17/00* (2006.01)

(52) U.S. Cl. ........................................................ 463/17

(58) Field of Classification Search ............... 463/16–25
See application file for complete search history.

(56) References Cited

U.S. PATENT DOCUMENTS

2008/0113723 A1* 5/2008 Okada ............................ 463/17
2008/0113726 A1* 5/2008 Okada ............................ 463/17
2008/0113730 A1* 5/2008 Okada ............................ 463/17
2008/0113732 A1* 5/2008 Okada ............................ 463/17

FOREIGN PATENT DOCUMENTS

WO WO2004/094013 A1 11/2004

* cited by examiner

*Primary Examiner* — Ronald Laneau
(74) *Attorney, Agent, or Firm* — NDQ&M Watchstone LLP

(57) ABSTRACT

A gaming apparatus according to the present invention comprises: a roulette wheel including a plurality of pockets associated with respective numbers in advance; a memory for storing a plurality of control data for controlling the gaming apparatus so as to provide different weights on probabilities that a ball is housed in each of the pockets; and a controller, the controller controlling rotation of the roulette wheel and launching of the ball by referring to a single control data out of the control data, determining a number corresponding to one of the pockets with the ball housed therein as a winning number, determining whether or not to offer a prize based on the determined winning number and a BET placed by a player, determining whether or not to generate a predetermined bonus different from the prize, and selecting another control data different from the single control data, out of the plurality of control data, and setting the selected control data as a reference target, when determining that the predetermined bonus different from the prize is to be generated.

4 Claims, 11 Drawing Sheets

Fig. 2

| Control data | | | Area |
| --- | --- | --- | --- |
| Motor driving time (sec) | Ball initial speed | Launching delay time (sec) | |
| 10 | Initial speed a | 0 | A |
| 11 | Initial speed b | 0.1 | B |
| 12 | Initial speed c | 0.2 | C |
| 13 | Initial speed d | 0.3 | D |
| 14 | Initial speed e | 0.4 | E |
| 15 | Initial speed f | 0.5 | F |

GAMING APPARATUS AND PLAYING METHOD THEREOF

CROSS-REFERENCE TO RELATED APPLICATIONS

This application claims benefit of priority based on U.S. Provisional Patent Application No. 60/858,345 filed on Nov. 13, 2006. The contents of this application are incorporated herein by reference in their entirety.

BACKGROUND OF THE INVENTION

1. Field of the Invention

The present invention relates to a gaming apparatus such as a roulette gaming machine, bingo gaming machine and the like, and a playing method of the same.

2. Discussion of the Background

Conventionally, when roulette games are played, a dealer throws a ball onto a roulette wheel, in general. However, in recent years, automatization of such roulette games has been advanced, and there have been suggested gaming apparatuses capable of processing roulette games in a full automatic manner, without the dealer throwing in the ball.

Among such gaming apparatuses, there are gaming apparatuses capable of throwing in a ball using air, as disclosed in WO 04/094013 A1. Gaming apparatuses which process roulette games in a full automatic manner are desired to drop and house a ball into respective pockets with an even probability. Therefore, among these gaming apparatuses, there are some gaming apparatuses designed to include a ball track having concavities and convexities on its surface for disturbing the behavior of the ball, in order to cause the ball to drop into respective pockets with an even probability.

It is an object of the present invention to enable changing the probabilities that a ball is housed in respective pockets as required, thereby offering new entertainment.

The contents of WO 04/094013 A1 are incorporated herein by reference in their entirety.

SUMMARY OF THE INVENTION

According to a first aspect of the present invention, there is provided a gaming apparatus having the following structure.

That is, the gaming apparatus according to the first aspect of the present invention is a gaming apparatus comprising: a roulette wheel including a plurality of pockets associated with respective numbers in advance; a memory for storing a plurality of control data for controlling the gaming apparatus so as to provide different weights on probabilities that a ball is housed in each of the pockets; and a controller. The controller controls rotation of the roulette wheel and launching of the ball by referring to a single control data out of the control data, determines a number corresponding to one of the pockets with the ball housed therein as a winning number, determines whether or not to offer a prize based on the determined winning number and a BET placed by a player, determines whether or not to generate a predetermined bonus different from the prize, and selects another control data different from the single control data, out of the plurality of control data, and sets the selected control data as a reference target, when determining that the predetermined bonus different from the prize is to be generated.

According to a second aspect of the present invention, there is provided a gaming apparatus having the following structure.

That is, the gaming apparatus according to the second aspect of the present invention is a gaming apparatus comprising: a roulette wheel including a plurality of pockets associated with respective numbers in advance; a memory for storing a plurality of control data for controlling the gaming apparatus so as to provide a relatively high weight on a probability that a ball is housed in any of the pockets constituting a single group, the single group belonging to a plurality of groups each of which consists of a predetermined number of the plurality of pockets, and the plurality of control data associated with each of the groups; and a controller. The controller controls rotation of the roulette wheel and launching of the ball by referring to a single control data out of the control data, determines a number corresponding to one of the pockets with the ball housed therein as a winning number, determines whether or not to offer a prize based on the determined winning number and a BET placed by a player, determines whether or not to generate a predetermined bonus different from the prize, and selects another control data different from the single control data, out of the plurality of control data, and sets the selected control data as a reference target, when determining that the predetermined bonus different from the prize is to be generated.

According to a third aspect of the present invention, there is provided a playing method of a gaming apparatus having the following structure.

That is, the playing method of a gaming apparatus according to the third aspect of the present invention is a playing method of a gaming apparatus comprising the steps of: controlling rotation of a roulette wheel and launching of a ball by referring to a single control data, the single control data selected out of a plurality of control data for controlling the gaming apparatus so as to provide different weights on probabilities that the ball is housed in any of a plurality of pockets included in the roulette wheel and associated with respective numbers in advance; determining a number corresponding to one of the pockets with the ball housed therein as a winning number; determining whether or not to offer a prize based on the determined winning number and a BET placed by a player; determining whether or not to generate a predetermined bonus different from the prize; and selecting another control data different from the single control data, out of the plurality of control data, and setting the selected control data as a reference target, when determining that the predetermined bonus different from the prize is to be generated.

According to a fourth aspect of the present invention, there is provided a playing method of a gaming apparatus having the following structure.

That is, the playing method of a gaming apparatus according to the fourth aspect of the present invention is a playing method of a gaming apparatus comprising the steps of: controlling rotation of a roulette wheel and launching of a ball by referring to a single control data, the single control data selected out of a plurality of control data for controlling the gaming apparatus so as to provide a relatively high weight on a probability that the ball is housed in any of the pockets constituting a single group, the single group belonging to a plurality of groups each of which consists of a predetermined number of pockets out of a plurality of pockets being included in the roulette wheel and being associated with respective numbers in advance; determining a number corresponding to one of the pockets with the ball housed therein as a winning number; determining whether or not to offer a prize based on the determined winning number and a BET placed by a player; determining whether or not to generate a predetermined bonus different from the prize; and selecting another control data different from the single control data, out of the plurality of control data, and setting the selected control data as a reference target, when determining that the predetermined bonus different from the prize is to be generated.

BRIEF DESCRIPTION OF THE DRAWINGS

FIG. 2 is a view illustrating exemplary control data;

DESCRIPTION OF THE EMBODIMENTS

Figure 1:
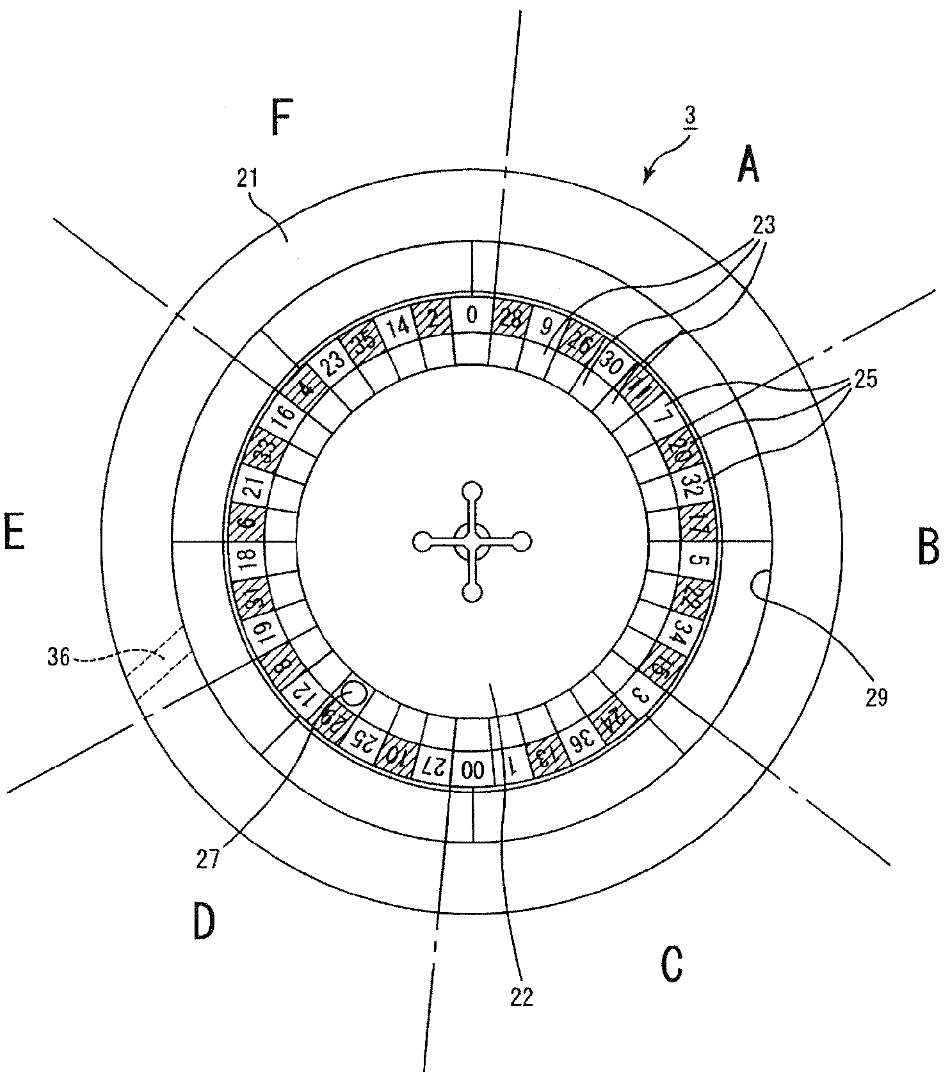
FIG. 1 is a plan view of a roulette device according to the present embodiment.
Figure 3:
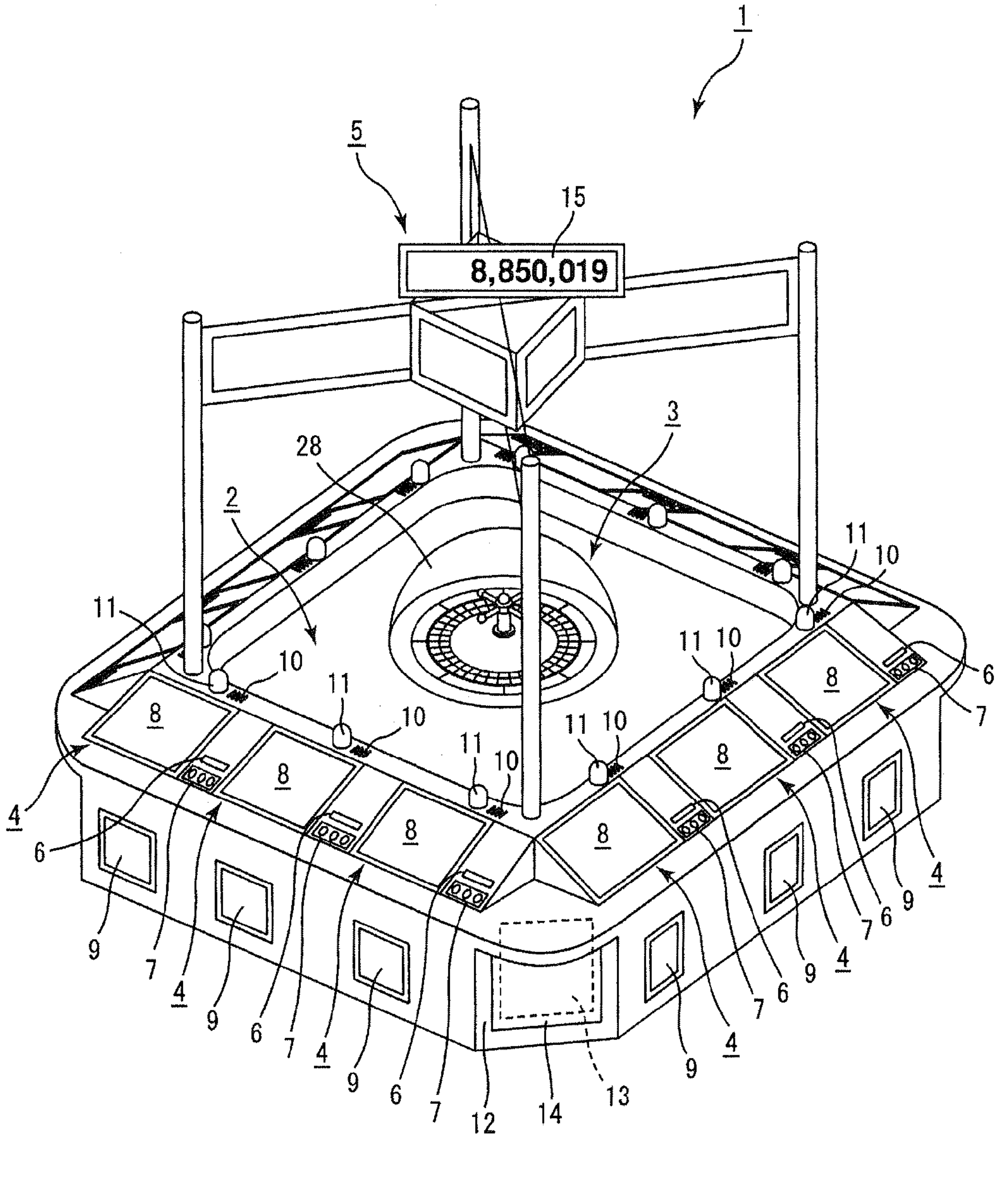
FIG. 3 is an external perspective view illustrating the general structure of a roulette gaming machine according to the present embodiment.

FIG. 1 is a plan view of a roulette device according to the present embodiment. FIG. 2 is a view illustrating exemplary control data. FIG. 3 is an external perspective view illustrating the general structure of a roulette gaming machine according to the present embodiment. While the roulette gaming machine 1 is a standalone type gaming machine which is not connected to a network, the present invention can be applied to a gaming machine connected to a network.

As illustrated in FIG. 1, the roulette device 3 included in the roulette gaming machine 1 (see FIG. 3) includes a frame member 21 secured to a cabinet 2 (see FIG. 3), and a roulette wheel 22 which is rotatably housed and supported inside the frame member 21. On an upper surface of the roulette wheel 22, there are formed a large number of concave-shaped number pockets 23 (a total of 38 number pockets in the present embodiment). Further, on the upper surface of the roulette wheel 22 in the outer directions of the respective number pockets 23, there are formed number display plates 25 displaying respective numbers of "0", "00", and "1" to "36", in association with the respective number pockets 23.

A ball throwing port 36 is formed in the frame member 21. A ball throwing device 104 (see FIG. 8) is connected to the ball throwing port 36, so that a ball 27 can be thrown onto the roulette wheel 22 from the ball throwing port 36 by being driven by the ball throwing device 104. Further, the roulette device 3 is entirely covered with a hemispherical transparent acrylic cover member 28 (see FIG. 3) thereabove.

Below the roulette wheel 22, there is provided a wheel-driving motor 106 (see FIG. 9), so that the roulette wheel 22 is rotated by being driven by the wheel-driving motor 106.

Further, metal plates (not illustrated) are mounted at predetermined intervals below the roulette wheel 22, and these metal plates are detected by a proximity sensor included in a pocket position detection circuit 107 (see FIG. 8), which enables detecting the positions of the number pockets 23.

The frame member 21 is gently inclined in an inward direction, and a guide wall 29 is formed at a middle position thereof. The guide wall 29 is for guiding the thrown ball 27 against a centrifugal force to cause the ball 27 to roll. As a rotation speed of the ball 27 decreases and, thus, the centrifugal force thereof decreases, the ball 27 rolls along the inclined surface of the frame member 21 and travels inwardly to reach the rotating roulette wheel 22. Then, the ball 27 which has rolled and reached the roulette wheel 22 passes over the number display plates 25 outside the still rotating roulette wheel 22 and then is housed in one of the number pockets 23. As a result, a ball sensor 105 (see FIG. 8) detects the number displayed to the number display plate 25 corresponding to the number pocket 23 housing the ball, and this number becomes a winning number.

Rotation of the roulette wheel 22 and launching of the ball 27 are performed based on control data.

As illustrated in FIG. 2, the control data includes motor driving time, ball initial speed, and launching delay time.

Figure 8:
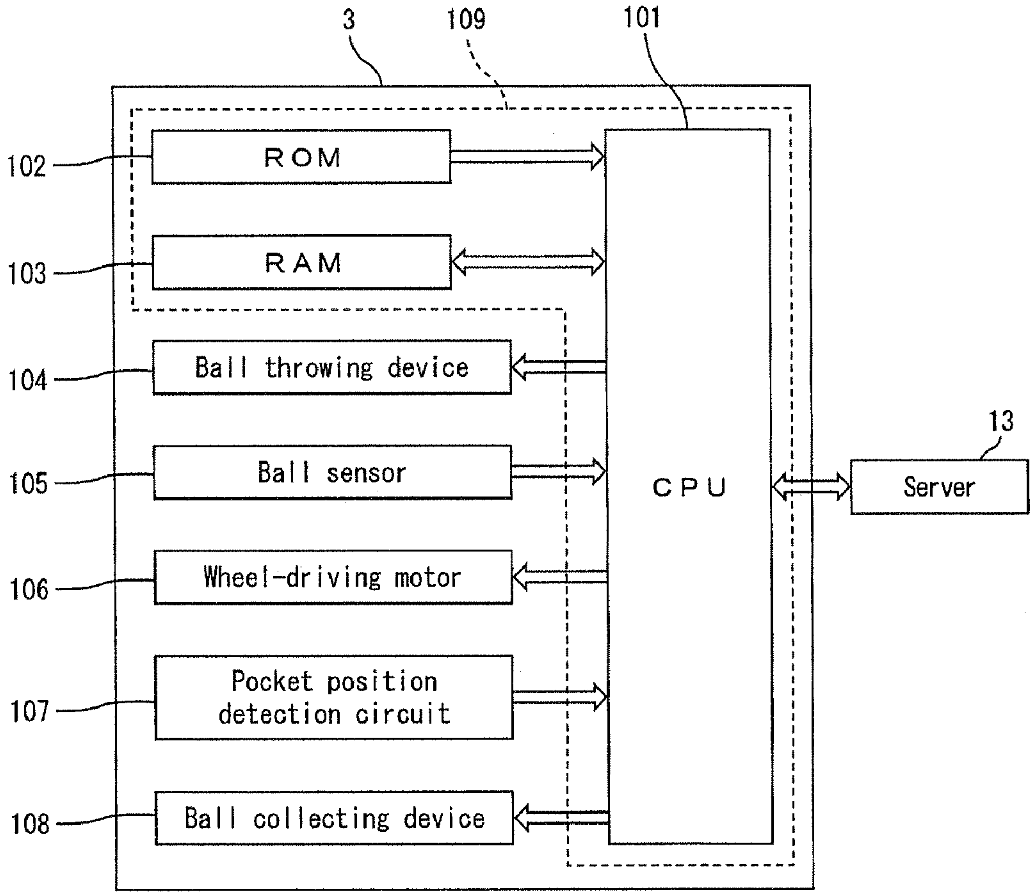
FIG. 8 is a block diagram illustrating the internal structure of the roulette device according to the present embodiment.

The motor driving time is for driving the wheel-driving motor 106 (see FIG. 8). The roulette wheel 22 is rotated at a predetermined rotation speed by the wheel-driving motor 106 for a length of time corresponding to a motor driving time. Further, after the roulette wheel 22 is released from the driving by the wheel-driving motor 106, the rotation speed of the roulette wheel 22 gradually decreases and the roulette wheel 22 finally stops. Further, the ball initial speed is an initial speed for throwing the ball 27 from the ball throwing device 104. The launching delay time is a time since a predetermined number pocket 23 passes through a predetermined position until a ball is launched, during the rotation of the roulette wheel 22.

As illustrated in FIG. 1, the roulette wheel 22 is divided into 6 areas, which are areas A to F. Each area is constituted by 6 or 7 number pockets 23 adjacent to one another.

The respective control data are determined so as to provide a higher weight on the probability that the ball 27 is housed in one of the areas A to F. For example, when the rotation of the roulette wheel 22 and the launching of the ball 27 are controlled based on the control data "a motor driving time of 10 sec, a ball initial speed a and a launching delay time of 0," the respective control data are determined so as to provide a higher weight on the probability that the ball 27 is housed in the area A.

In the present embodiment, the roulette wheel 22 rotates counterclockwise, and the ball 27 moves clockwise. For example, when the ball initial speed and the launching delay time are fixed, as the motor driving time is made longer, an area with a high probability of housing the ball 27 (hereinafter also referred to as a high probability area) is changed in the following order: A→B→C→D→E→F→A and so forth.

Further, for example, when the motor driving time and the launching delay time are fixed, as the ball initial speed is made higher, the high probability area is changed in the following order: A→B→C→D→E→F→A and so forth.

Moreover, for example, when the motor driving time and the ball initial speed are fixed, as the launching delay time is made longer, the high probability area is changed in the following order: A→B→C→D→E→F→A and so forth.

Accordingly, in the present invention, when the control data includes any one of data on wheel rotation control (motor driving time), data on timing for launching the ball (launching delay time), and data on the initial speed of the ball being launched (ball initial speed), a plurality of control data different in high probability area can be set, thereby providing different weights on the probability of each number pocket 23 housing the ball 27.

Further, in the present embodiment, when the initial speed is changed from an initial speed "a" to an initial speed "b", from the initial speed "b" to an initial speed "c", from the initial speed "c" to an initial speed "d" and so forth, the high probability area is shifted by one area (e.g. the area is shifted from the area A to the area B). Further, every time the launching delay time is made longer by 0.1 second, the high probability area is shifted by one area. Moreover, every time the motor driving time is made longer by 1 second, the high probability area is shifted by five areas. Therefore, by combination of these, it is possible to set a plurality of control data different in high probability areas, so as to provide different weights on the probability of the each number pocket 23 housing the ball 27.

As in the present embodiment, when the control data is data including the combination of the data on wheel rotation control (motor driving time), the data on timing for launching the ball (launching delay time), and the data on the initial speed of the ball being launched (ball initial speed), apparent variations with respect to the player (e.g. the rotating time of the roulette wheel 22 is long, the initial speed of the ball 27 is high) can be involved.

Friction at the rotational axial section of the roulette wheel 22, the surface shape of the roulette wheel 22 (e.g. depression or distortion), and the like may vary among the roulette gaming machines 1 due to a variety of factors in manufacturing thereof. Hence there is a case where, even when common control data is used in each of the roulette gaming machines 1, the areas where the ball 27 is finally housed vary among the roulette gaming machines 1. Therefore, the control data may be set such that, for example, after completion of the manufacturing, tests are conducted with a variety of parameters included in the control data being changed as appropriate, to organize statistics concerning which parameter may allow which area to have a high probability of housing the ball 27. Namely, the control data may vary among the roulette gaming machines 1.

Moreover, even when the areas that finally house the ball 27 vary among the roulette gaming machines 1, the common control data may be used in each of the roulette gaming machines 1. This is because the probability of housing the ball in one of the areas should just be relatively high based on the control data in each of the roulette gaming machines 1.

The control data to be the reference target is switched when a later-described jackpot bonus game (hereinafter, also referred to as "JP bonus game") is generated and a jackpot (hereinafter, also referred to as "JP") is won.

The JP bonus game is played for acquiring a JP apart from a game using the roulette device 3. In a game according to the present embodiment, a processing for determining whether or not to generate a JP bonus game is executed, and the JP bonus game is played when it is determined to generate the JP bonus game.

The game using the roulette device 3 is a game in which a number corresponding to a number pocket 23 with a ball 27 housed therein is determined to be a winning number, and based on the winning number and a BET placed by a player, it is determined whether or not to regard the BET placed by the player as a winning BET.

When a JP is won in a JP bonus game, a credit with respect to the winning JP is paid out apart from a credit to be paid out with respect to the winning BET in a game using the roulette device 3.

The JP bonus game corresponds to a predetermined bonus in the present invention.

In the roulette gaming machine 1 according to the present embodiment, as described later, there are provided three types of JPs, "MEGA", "MAJOR" and "MINI". In the JP bonus game, when any JP among the above-mentioned three types of JPs is won, another control data different from the currently set control data is selected out of the plurality of control data illustrated in FIG. 2.

While, in the example, there has been described a case where the areas A to F are constituted by 6 or 7 number pockets 23 adjacent to one another, there is no particular limitation on the number of pockets belonging to a single group, in the present invention. Further, the respective groups can be constituted by the same number of pockets or different numbers of pockets.

Further, while, in the example, there has been described a case where the number pockets 23 are divided into the 6 areas (groups), which are the areas A to F, the number of areas (groups) is not limited to 6 in the present invention.

In the example, there has been described a case where the areas A to F are not overlapped with one another. Namely, there has been described a case where the pockets belonging to a single group do not belong to the other groups. However, the present invention is not limited thereto, and a single pocket can belong to a plurality of groups.

While, in the example, there has been described a case where a plurality of control data are provided in association with the respective areas (groups), it is necessary only that a plurality of control data are provided, but it is not necessary that they are associated with the respective areas (groups), in the present invention.

While, in the example, there has been described a case where the control data is constituted by motor driving time, ball initial speeds and launching delay time, the control data of the present invention is not limited thereto, but may be data including one of data relating to wheel rotation control (motor driving time), data relating to a timing of ball launching (launching delay time), and data relating to an initial speed for launching a ball (ball initial speeds), or a combination thereof.

Such data relating to wheel rotation control may be, for example, rotation speeds of the roulette wheel when it is driven by the motor, as well as motor driving time.

In the foregoing example, the case was described where the control data corresponds one-to-one to the area, e.g. control data with "the motor driving time: 10 sec, the ball initial speed: a, the launching delay time: 0" corresponds to the area A. However, the control data in the present invention is not limited thereto so long as the control data serves to perform control so as to provide different weights on the probability of each of the pockets housing the ball. For example, the control data may be data where the probability of the pocket housing the ball is fixed, the pocket belonging to each area (group), e.g., the probability that the number pocket 23 belonging to the area A houses the ball 27 is 70%, the probability that the number pocket 23 belonging to the area B houses the ball 27 is 20%, or the probability that the number pocket 23 belonging to the area C houses the ball 27 is 10%. In such a configuration, for example, a single group may be determined based on the above probabilities to control such that the pocket belonging to the determined group houses the ball.

Next, the structure of the roulette gaming machine 1 will be described.

As illustrated in FIG. 3, the roulette gaming machine 1 includes the cabinet 2 forming a main body, the roulette device 3 provided at a substantially center portion of the upper surface of the cabinet 2, a plurality of stations 4 (12 stations, in the present embodiment) installed around the roulette device 3 to surround the roulette device 3, and an electric lighting display portion 5 provided above the cabinet 2.

The stations 4 include, at least, a medal insertion port 6 for inserting a currency value, a control portion 7 constituted by a plurality of control buttons and the like which enable a player to input predetermined commands, and an image display device 8 capable of displaying images relating to games. Further, the stations 4 receive betting operations by the player. The player can process games being deployed, by operating the touch panel, the control portion 7 and the like, while looking at the image being displayed to the image display device 8.

In the roulette gaming machine 1, a medal or electronic valuable information (e.g. credit) is used as the currency value. However, the currency value is not particularly limited. For example, it can be exemplified by a coin, a bill, a token and electronic money.

Further, medal payout ports 9 are provided in the side surfaces of the cabinet 2 in which the stations 4 are installed. Further, above the image display devices 8 in the respective stations 4, to the right thereof, there are provided speakers 10 for generating music, effect sounds and the like.

Above the image display devices 8 in the respective stations 4, there are provided WIN lamps 11. In the event of the occurrence of winning relating to numbers ("0", "00" or "1" to "36" in the present embodiment) on which the player betted at the station 4 during a game, the WIN lamp 11 in the winning station 4 is lighted. Further, during JP bonus games for acquiring a JP, in the event that a station 4 acquires a JP, the WIN lamp 11 in the station 4 which acquired the JP is similarly lighted. Further, the WIN lamps 11 are provided at positions viewable from all the installed stations 4 (12 stations, in the present embodiment), which enables other players playing games with the same roulette gaming machine 1 to recognize the WIN lamps 11 being lighted anytime.

Inside of each medal insertion port 6, there is provided a medal sensor (not illustrated) which distinguishes the currency value inserted from the medal insertion port 6, such as medals, and counts the inserted medals. Further, inside of each medal payout port 9, there is provided a hopper (not illustrated) which pays out predetermined numbers of medals from the medal payout port 9.

A server 13 is placed inside of a corner portion 12 positioned at a corner of the cabinet 12. The server 13 is housed within the corner portion 12 in general in order to prevent it from being operated by players, but a corner door 14 provided at the corner portion 12 can be opened using a key switch in order to enable operations of the server 13. Further, by operating the server 13, various types of setting can be made for the roulette gaming machine 1.

In the electric lighting display portion 5, there is provided a JP-value display portion 15 which displays the value of JP. For the JP "MEGA", 0.15% of the credits betted during games at all the 12 stations 4 are cumulatively stored. For the JP "MAJOR", 0.20% of the betted credits are cumulatively stored. For the JP "MINI", 0.30% of the betted credits are cumulatively stored. Further, in the event that the player wins any one of the JP during JP bonus, credits corresponding to the cumulative value accumulated for the corresponding JP are paid out to a predetermined station 4. The JP-value display portion 15 displays the cumulative value for the JP "MEGA", out of the three types of JP. Further, the JP-value display portion 15 is provided at the top portion of the electric lighting display portion 5, which enables all players playing games at the stations 4 to view the content of the display thereto.

Figure 4:
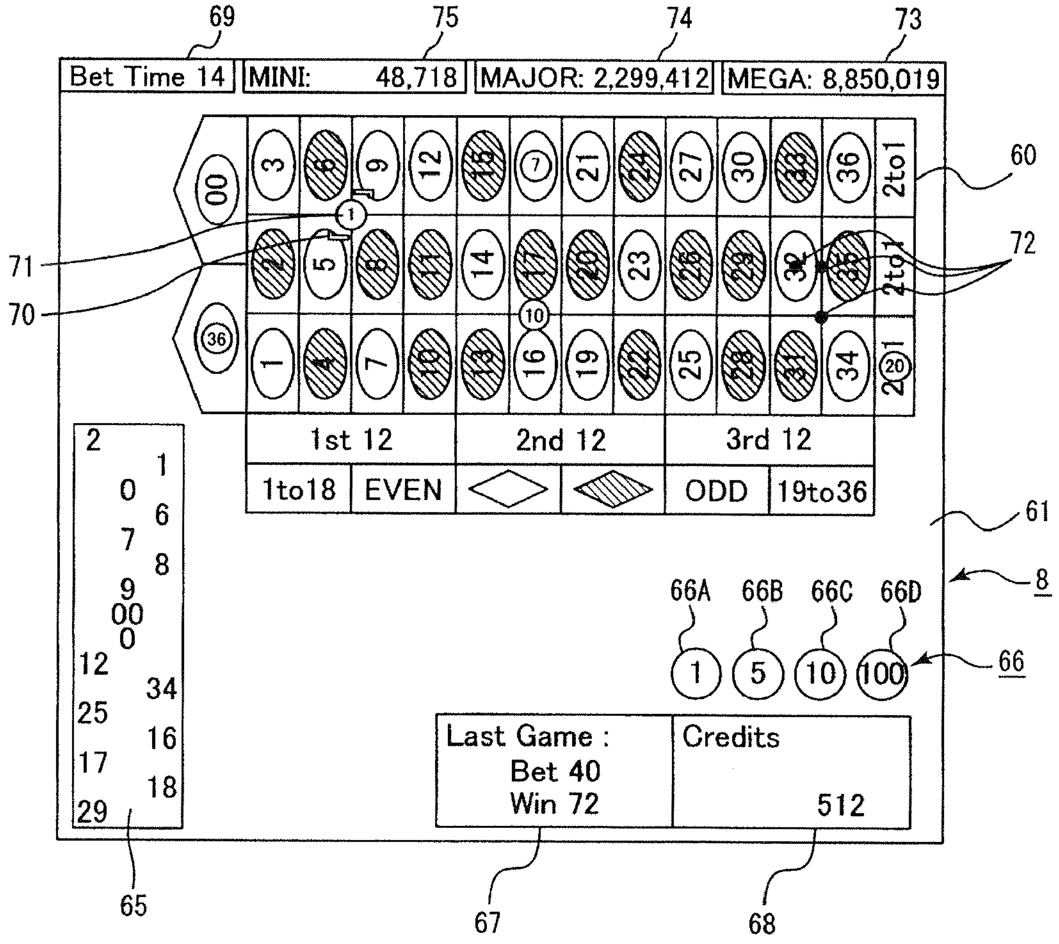
FIG. 4 is a view illustrating an exemplary image displayed to an image display device.

FIG. 4 is a view illustrating an exemplary image displayed to an image display device.

As illustrated in FIG. 4, during games, the image display device 8 displays, thereto, a BET screen 61 having a table-type betting board 60. The player can bet chips using his or her own credits, by operating the touch panel 50 (see FIG. 10) provided in the front surface of the image display device 8.

First, based on FIG. 4, there will be described the BET screen 61 which is displayed during games. In the table-type betting board 60 being displayed in the BET screen 61, 38 types of numbers "0", "00" and "1" to "36" are displayed and arranged in a grid shape. Further, specific BET areas are similarly arranged in a grid shape, wherein the specific BET areas are for specifying "odd numbers", "even numbers", "the types of colors of the number display plates (red or black)", "certain numerical ranges (for example, "1" to "12" and the like) so that chips can be betted thereon.

Under the table-type betting board 60, there are displayed a result history display portion 65, unit BET buttons 66, a payback result display portion 67, and a number-of-credit display portion 68.

The result history display portion 65 displays a list of winning numbers resulted from the previous games (in this case, "a single game" refers to a series of operations starting with betting by a player in any of the stations 4 and then throwing the ball 27 into the number pockets 23 and ending with paying back credits based on the winning number). In this case, when a single game ends, a new winning number is added and displayed to the top of the list, which enables recognizing the history of winning numbers resulted from up to 16 games.

Further, the unit BET buttons 66 are for betting chips on a BET area 72 (over a grid having a number or mark or over a line defining grids) specified by the player. The unit BET button 66 is constituted by four buttons, which are a 1-BET button 66A, a 5-BET button 66B, a 10-BET button 66C and a 100-BET button 66D.

At first, the player specifies a BET area 72 on which he or she desires to bet, with a cursor 70 which will be described later, by directly pushing it on the screen. By pushing the 1-BET button 66A at this state, the player can bet one chip at a time (i.e., every time the 1-BET button 66A is pushed with fingers or the like, the number of BETs is increased in the order of "1", "2", "3" and so forth). By pushing the 5-BET button 66B, the player can bet five chips at a time (i.e., every time the 5-BET button 66B is pushed with fingers or the like, the number of BETs is increased in the order of "5", "10", "15" and so forth). By pushing the 10-BET button 66C, the player can bet ten chips at a time (i.e., every time the 10-BET button 66C is pushed with fingers or the like, the number of BETs is increased in the order of "10", "20", "30" and so forth). Further, by pushing the 100-BET button 66D, the player can bet 100 chips at a time (every time the 100-BET button 66D is pushed with fingers or the like, the number of BETs is increased in the order of "100", "200", "300" and so forth).

The payback result display portion 67 displays the number of chips betted by the player and the number of paid-back credits in the previous game. In this case, the number of paid-back credits minus the number of betted chips indicates the number of credits that the player newly acquired in the previous game.

The number-of-credit display portion 68 displays the number of credits possessed by the current player. If chips are betted, the number of credits is decreased by an amount corresponding to the number of BETs (1 BET corresponds to 1 credit). In the event of that winning relating to the betted chips occurs and credits are paid back, the number of credits is increased by the number of paid-back credits. Further, if the number of credits possessed by the player becomes 0, the games end.

Further, above the table-type betting board 60, a BET time display portion 69 is provided. The BET time display portion 69 displays the remaining time during which the player can bet. The BET time display portion 69 displays "20" at the start of reception of betting operations, then decreases the number by one at every second and displays "0" at the end of reception of betting operations. Further, when the remaining betting time for the player reaches 5 seconds at each station 4, the ball throwing device is driven to throw the ball 27 onto the roulette board.

Further, to the right of the BET-time display portion 69, there are provided a MEGA display portion 73 which displays the number of credits accumulated for the JP "MEGA" until the present time, a MAJOR display portion 74 which displays the number of credits accumulated for the JP "MAJOR" until the present time, and a MINI display portion 75 which displays the number of credits accumulated for the JP "MINI" until the present time. The MEGA display portion 73 displays a number of credits resulted from cumulatively accumulating 0.15% of the credits betted in every single game at all 12 stations 4. The MAJOR display portion 74 displays a number of credits resulted from cumulatively accumulating 0.20% of the betted credits. The MINI display portion 75 displays a number of credits resulted from cumulatively accumulating 0.30% of the betted credits. The MEGA display portion 73, the MAJOR display portion 74 and the MINI display portion 75 display numerical values which are common among all the stations 4. In the event that the player wins a JP during a JP bonus game, the credits for the JP won by the player are paid out, out of the three types of JP displayed to the display portions 73 to 75, and, after the paying out, the JP display portion displays an initial numerical value (i.e., 200 credits for "MINI", 5000 credits for "MAJOR" and 50000 credits for "MEGA").

Further, on the table-type betting board 60, the cursor 70 indicating the BET area 72 being currently selected by the player is displayed. Further, a chip mark 71 indicating the number of chips betted up to the present time and the BET area 72 is displayed, wherein the number displayed to the chip mark 71 indicates the number of betted chips. For example, as illustrated in FIG. 4, a "7" chip mark 71 placed on the "18" grid indicates that 7 chips are being betted on the number "18". Further, such a method for betting on only a single number is a betting method called "Straight BET".

Further, a "1" chip mark 71 placed at the intersection of the "5", "6", "8" and "9" grids indicates that all the four numbers are covered, meaning a single chip is being betted on the four numbers "5", "6", "8" and "9". Further, such a method covering four numbers for betting on the four numbers is a betting method called "Corner BET".

As other betting methods, there are "Split BET" which covers two numbers using the line between the two numbers so as to bet on two numbers; "Street BET" which covers three numbers using an end of a lateral single row of numbers (a vertical single row, in FIG. 4) so as to bet on three numbers (for example, "13", "14" and "15"); "Five BET" which covers five numbers using the line between the numbers "00" and "3" so as to bet on five numbers "0", "00", "1", "2" and "3"; "Line BET" which covers six numbers using the space between two lateral rows of numbers (two vertical rows in FIG. 5) so as to bet on six numbers (for example, "13", "14", "15", "16", "17" and "18"); "Column BET" which covers twelve numbers using a "2-to-1" grid so as to bet on twelve numbers; and "Dozen BET" which cover twelve numbers using any of "1st-12", "2nd-12" and "3rd-12" grids so as to bet on twelve numbers. Further, there is a method which covers 18 numbers so as to bet on 18 numbers, by specifying the 18 numbers from any of the colors of the number display plates ("red" or "black"), odd numbers or even numbers, and numbers equal to or less than 18 or numbers equal to or greater than 19, using 6 grids provided at the lowermost stage of the table-type betting board 60. Here, these plurality of betting methods result in different credit payout values (payout value ratios) per single chip, in the event of the occurrence of winning relating to betted chips.

When a player performs betting through the BET screen 61 having the above-mentioned configuration, the player specifies a BET area 72 (over a grid having a number or mark or over a line defining grids) on which he or she desires to bet, by directly pushing it on the screen with his or her finger. As a result, the cursor 70 moves to the specified BET area 72.

Thereafter, by pushing each unit button (the 1-BET button 66A, the 5-BET button 66B, the 10-BET button 66C and the 100-BET button 66D), out of the unit BET buttons 66, a number of chips corresponding to the number of units are betted on the specified BET area 72. For example, by pushing the 10-BET button 66C four times, pushing the 5-BET button 66B a single time and pushing the 1-BET button 66A three times, it is possible to bet a total of 48 chips.

Figure 5:
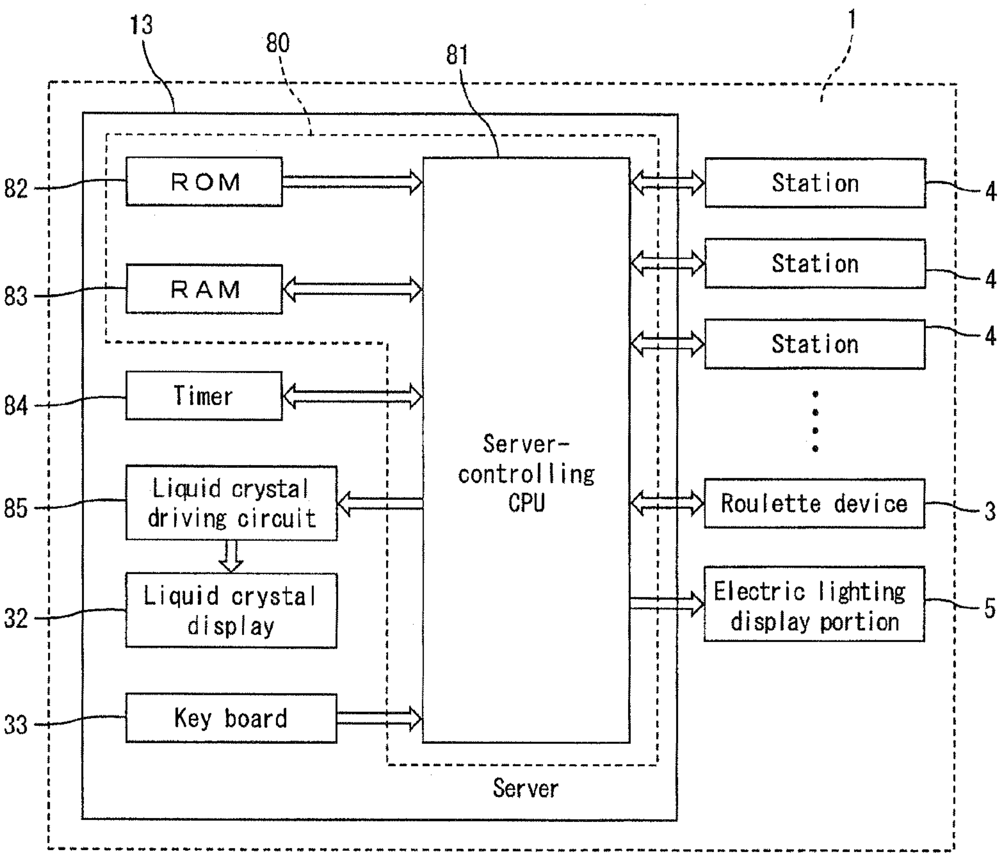
FIG. 5 is a block diagram illustrating the internal structure of the roulette gaming machine according to the present embodiment.

FIG. 5 is a block diagram illustrating the internal structure of the roulette gaming machine according to the present embodiment.

As illustrated in FIG. 5, the roulette gaming machine 1 is constituted by the server 13 and the plurality of stations 4 (12 stations in the present embodiment) connected to the server 13, wherein the roulette device 3 and the electric lighting display portion 5 are connected to the server 13. Further, the internal structures of the roulette device 3 and the stations 4 will be described in detail later.

The server 13 includes a server-controlling portion 80 comprised of a server-controlling CPU 81 which controls the entire server 13, a ROM 82, and a RAM 83. The server-controlling portion 80 corresponds to a controller in the present invention. Further, the server-controlling CPU 81 includes a timer 84, a liquid crystal display 32 connected through a liquid crystal driving circuit 85, and a key board 33.

The server-controlling CPU 81 conducts various types of processing, based on input signals supplied from the respective stations 4 and data and programs stored in the ROM 82 and the RAM 83. Then, based on the results thereof, the server-controlling CPU 81 transmits command signals to the stations 4, to control the respective stations 4 in an initiative manner. Particularly, the server-controlling CPU 81 transmits control signals to the roulette device 3 to control the launching of the ball 27 and the rotation of the roulette wheel 22.

The ROM 82, which is constituted by, for example, a semiconductor memory and the like, stores programs for realizing basic functions of the roulette gaming machine 1, programs for setting and managing annunciation of maintenance times and conditions to be announced, payout value ratios for roulette games (the numbers of credits to be paid out for winning per single chip), programs for controlling the respective stations 4 in an initiative manner, and the like.

On the other hand, the RAM 83 temporarily stores information on betted chips supplied from the respective stations 4, winning numbers of the roulette device 3 determined by a sensor, JP values accumulated until the present time, data about the results of processing executed by the server-controlling CPU 81 and the like.

Further, the timer 84 for use in time measurement is connected to the server-controlling CPU 81.

Time information from the timer 84 is transmitted to the server-controlling CPU 81, which controls rotation operation on the roulette wheel 22 and throwing in of the ball 27, based on the time information from the timer 84, as will be described later.

Further, the electric lighting display portion 5 (see FIG. 3) is connected to the server-controlling CPU 81. Further, the server-controlling CPU 81 controls light emission from LEDs and the like for performing illumination effects and also for displaying predetermined characters and the like to the electric lighting display portion 5. Further, the server-controlling CPU 81 especially causes the JP-value display portion 15 in the electric lighting display portion 5 to display the value of a JP (JP "MEGA" in the present embodiment) which has been accumulated until the present time.

Figure 6:
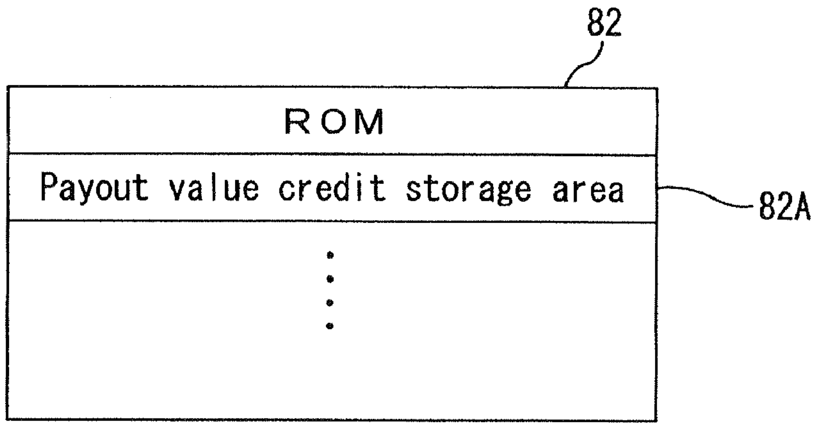
FIG. 6 is a schematic view illustrating a storage area of a ROM in the roulette gaming machine according to the present embodiment.

FIG. 6 is a schematic view illustrating the storage area of the ROM in the roulette gaming machine according to the present embodiment.

As illustrated in FIG. 6, the ROM 82 is provided with a payout value credit storage area 82A storing payout value ratios relating to games. Further, as payout value ratios for the respective BET areas 72 in the BET screen 61 stored in the payout value credit storage area 82A, there have been stored, in advance, predetermined ratios "×2" to "×36", depending on the types of betting methods (such as "Straight BET", "Corner BET", "Split BET" and the like).

Figure 7:
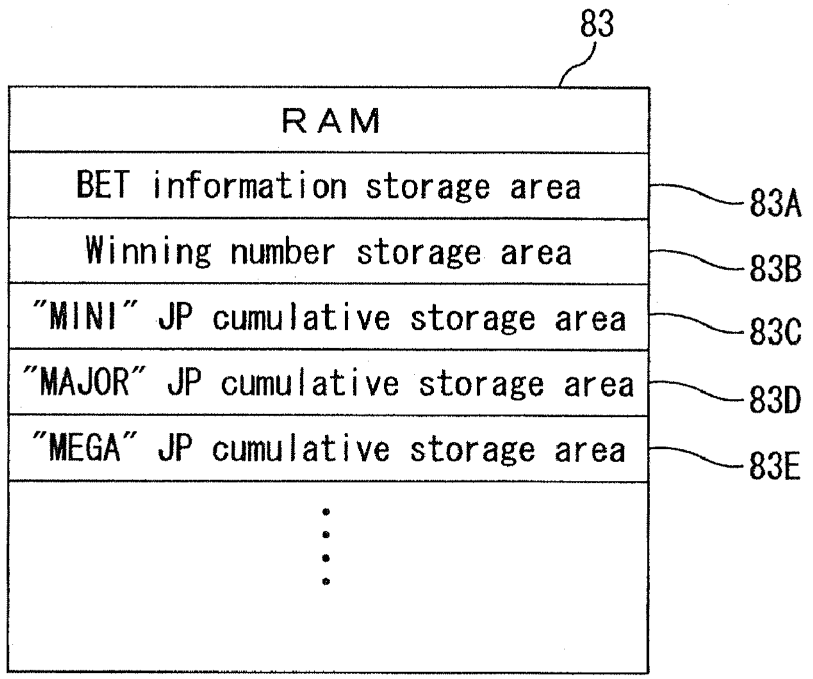
FIG. 7 is a schematic view illustrating a storage area of a RAM in the roulette gaming machine according to the present embodiment.

FIG. 7 is a schematic view illustrating the storage area of the RAM in the roulette gaming machine according to the present embodiment.

As illustrated in FIG. 7, the RAM 83 is provided with a BET information storage area 83A which stores information on betting by players currently playing games, a winning-number storage area 83B which stores a winning number of the roulette device 3 determined by the ball sensor 105, a "MINI" JP cumulative storage area 83C which stores the number of credits cumulatively accumulated for the JP "MINI", a "MAJOR" JP cumulative storage area 83D which stores the number of credits cumulatively accumulated for the JP "MAJOR", and a "MEGA" JP cumulative storage area 83E which stores the number of credits cumulatively accumulated for the JP "MEGA". Further, more specifically, the betting information is information on betting performed through the stations 4, such as BET areas 72 (see FIG. 4) specified on the BET screen 61, the numbers of betted chips (the numbers of BETs), and the types of betting methods.

FIG. 8 is a block diagram illustrating the internal structure of the roulette device according to the present embodiment.

As illustrated in FIG. 8, the roulette device 3 includes a control portion 109, the pocket position detection circuit 107, the ball throwing device 104, the ball sensor 105, the wheel-driving motor 106 and a ball collecting device 108.

The control portion 109 includes a CPU 101, a ROM 102 and a RAM 103. The CPU 101 controls the launching of the ball 27 and the rotation of the roulette wheel 22, based on control signals supplied from the server 13 and data and programs stored in the ROM 102 and the RAM 103.

Figure 9:
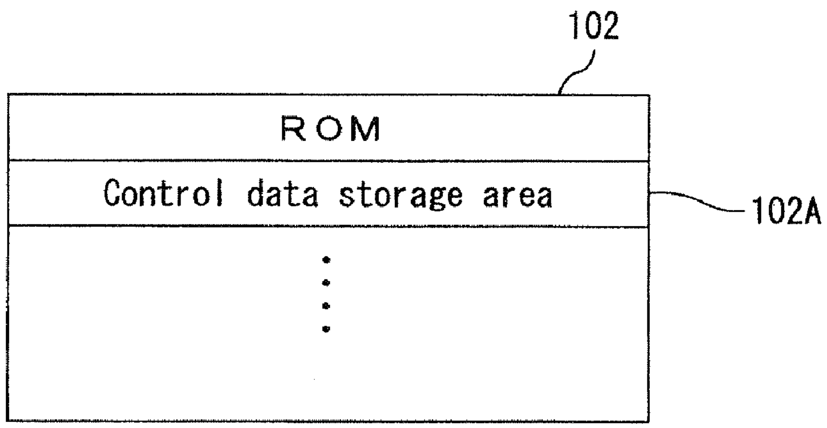
FIG. 9 is a schematic view illustrating a storage area of a ROM in the roulette device according to the present embodiment.

FIG. 9 is a schematic view illustrating the storage area of the ROM in the roulette device according to the present embodiment.

As illustrated in FIG. 9, the ROM 102 is provided with a control data storage area 102A which stores control data having the structure described with reference to FIG. 2.

The pocket position detection circuit 107 includes a proximity sensor and detects the position of the roulette wheel 22 based on the presence or absence of detections of a metal plate mounted to the roulette wheel 22.

The ball throwing device 104 is a device for throwing the ball 27 onto the roulette wheel 22 through the ball throwing port 36 (see FIG. 1). The ball throwing device 104 throws the ball 27 at an initial speed defined by the control data. Further, the ball throwing device 104 throws the ball 27 at timing based on a launching delay time defined by the control data. Namely, the ball throwing device 104 throws the ball 27 after the elapse of the launching delay time since the pocket position detection circuit 107 detected a predetermined number pocket 23 (for example, "00") passing a predetermined position (for example, the position at the front of the ball throwing port 36).

The ball sensor 105 is a device for determining which number pocket 23 the ball 27 has been housed in.

The wheel-driving-motor 106 is for rotating the roulette wheel 22 and stops the driving of the motor after the elapse of a motor driving time defied by the control data since the start of the driving thereof.

The ball collecting device 108 is a device for collecting the ball 27 thrown onto the roulette wheel 22 after the end of games.

Figure 10:
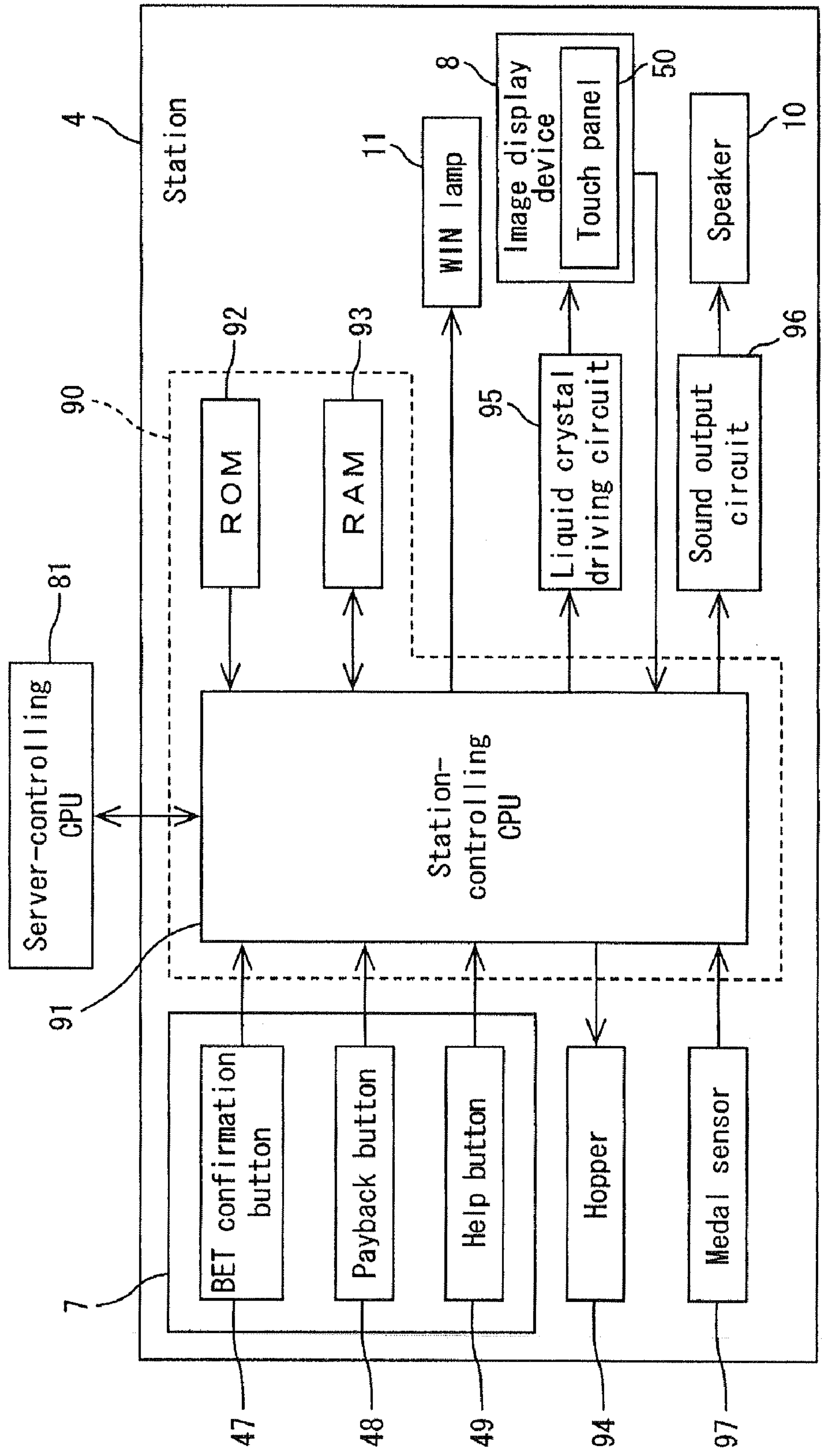
FIG. 10 is a block diagram illustrating the internal structure of a station according to the present embodiment.

FIG. 10 is a block diagram illustrating the internal structure of a station according to the present embodiment. Further, the twelve installed stations 4 have basically the same structure and, therefore, a single station 4 will be exemplarily described, hereinafter.

As illustrated in FIG. 10, the station 4 includes a station control portion 90 constituted by a station-controlling CPU 91, a ROM 92 and a RAM 93. The ROM 92 is constituted by, for example, a semiconductor memory or the like and stores programs for realizing basic functions of the station 4, other programs of various types necessary for controlling the station 4, data tables and the like. Further, the RAM 93 is a memory for temporarily storing various types of data resulted from calculations by the station-controlling CPU 91, the number of credits currently possessed by the player (accumulated in the station 4), the condition of betting of chips by the player, and the like.

Further, a BET confirmation button 47, a payback button 48 and a help button 49, which are provided in the control portion 7 (see FIG. 3), are connected to the station-controlling CPU 91.

The BET confirmation button 47 is to be pushed for confirming betting after betting operations through the image display device 8.

The payback button 48 is to be generally pushed at the end of games. When the payback button 48 is pushed, the number of medals corresponding to the credits acquired in games and the like and currently possessed by the player (a single medal for a single credit, in general) are paid out from the medal payout port 9.

The help button 49 is to be pushed when the game operating method or the like is unknown. Immediately after the help button 49 is pushed, a help screen describing information on various types of operations is displayed to the image display device 8.

The station-controlling CPU 91, based on operation signals issued by pushing respective buttons and the like, controls the station 4 for conducting various types of operations corresponding to the operation signals. More specifically, the station-controlling CPU 91 conducts various types of processing, based on input signals that the control portion 7 supplies thereto on receiving inputs of operations by the player, and data and programs stored in the ROM 92 and the RAM 93. Then, the station-controlling CPU 91 transmits the result of such processing to the server-controlling CPU 81.

Further, the station-controlling CPU 91, on receiving command signals from the server-controlling CPU 81, controls its peripheral devices constituting the station 4 for processing games in the station 4. Further, the station-controlling CPU 91 conducts various types of processing, based on input signals that the control portion 7 supplies thereto on receiving inputs of operations by the player, and data and programs stored in the ROM 92 and the RAM 93, and then controls its peripheral devices constituting the station 4 for processing games in the station 4, based on the result of such processing, depending on the contents of processing.

Further, a hopper 94 is connected to the station-controlling CPU 91. The hopper 94 pays out predetermined numbers of medals from the medal payout port 9 (see FIG. 3), according to command signals from the station-controlling CPU 91.

Further, the image display device 8 is connected to the station-controlling CPU 91 through a liquid crystal driving circuit 95. The liquid crystal driving circuit 95 includes a program ROM, an image ROM, an image-controlling CPU, a work RAM, a VDP (Video Display Processor) and a video RAM. The program ROM stores image-controlling programs relating to the display within the image display device 8, and various types of selection tables. The image ROM stores, for example, dot data for use in forming images to be displayed to the image display device 8. The image-controlling CPU is for determining images to be displayed to the image display device 8, out of the dot data pre-stored in the image ROM, according to the image-controlling programs pre-stored in the program ROM, based on parameters set in the station-controlling CPU 91. The work RAM is formed as a temporal storage device for use in executing the image-controlling programs with the image-controlling CPU. The VDP creates images corresponding to the content of display determined by the image-controlling CPU and outputs them to the image display device 8. Further, the video RAM is formed as a temporal storage device for use in creating images with the VDP.

Further, the touch panel 50 is provided in the front surface of the image display device 8 as previously described, and information on operations on the touch panel 50 is transmitted to the station-controlling CPU 91. On the touch panel 50, the player performs operations for betting chips through the BET screen 61. More specifically, the touch panel 50 is operated in selecting BET areas 72, operating the unit BET buttons 66 and the like, and information on such operations is transmitted to the station-controlling CPU 91. Then, based on such information, information on the betting by the current player (i.e., information on the BET areas specified on the BET screen 61 and the number of chips betted thereon) is stored in the RAM 93 anytime. Further, the betting information is transmitted to the server-controlling CPU 81 and is stored in the BET information storage area of the RAM 83.

Further, a sound output circuit 96 and a speaker 10 are connected to the station-controlling CPU 91, wherein the speaker 10 generates various types of effect sounds when various types of effects are conducted based on output signals from the sound output circuit 96.

Further, a medal sensor 97 is connected to the station-controlling CPU 91. The medal sensor 97 detects medals inserted from the medal insertion port 6 (see FIG. 3), calculates the value of the inserted medals and transmits the result to the station-controlling CPU 91. The station-controlling CPU 91, based on the transmitted signals, increases the number of credits possessed by the player which is stored in the RAM 93.

The WIN lamp 11 is connected to the station-controlling CPU 91. The station-controlling CPU 91 lights the WIN lamp 11 in predetermined colors, in the event of the occurrence of winning relating to chips betted on the BET screen 61 or the winning of JP.

Figure 11:
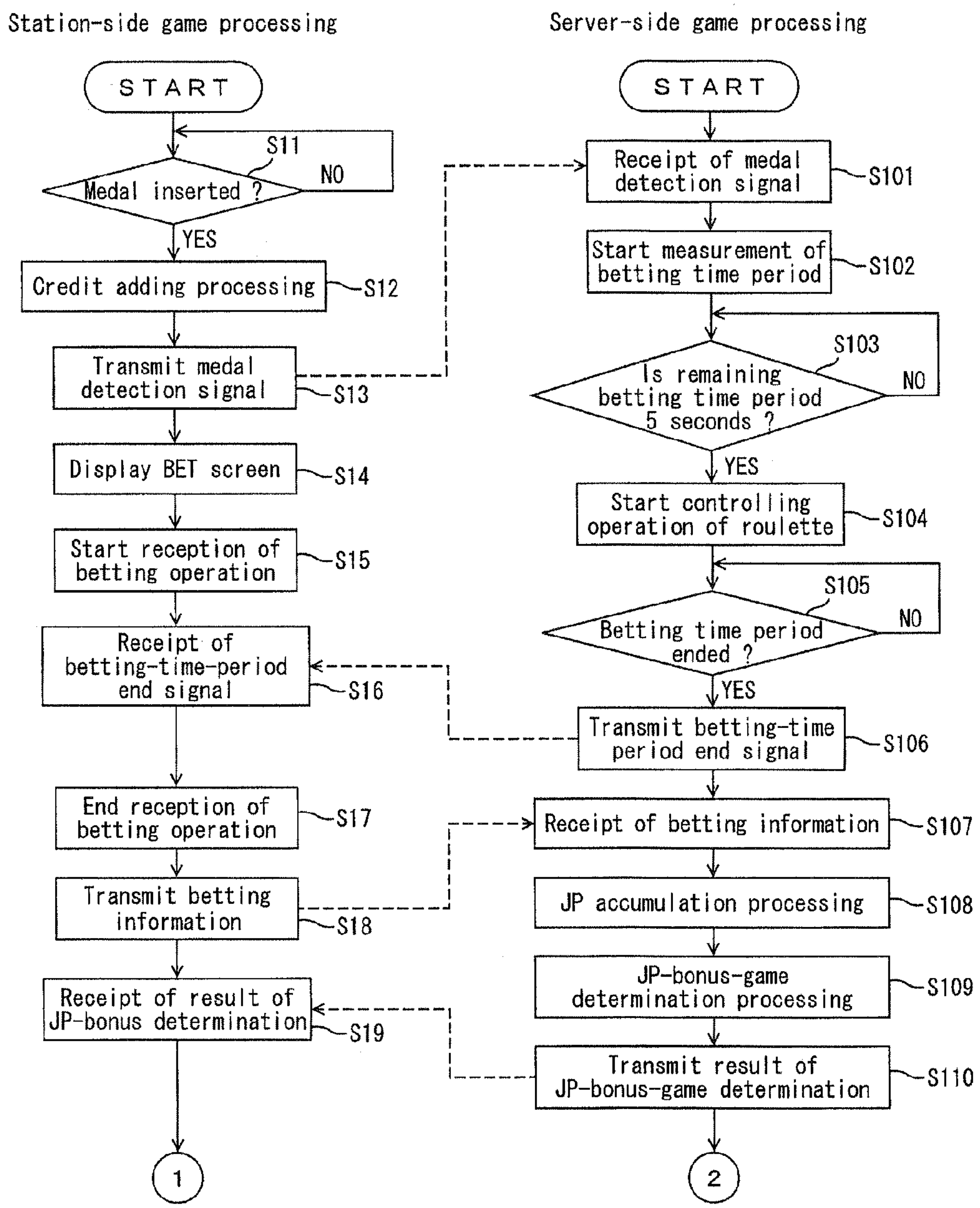
FIG. 11 is a flow chart illustrating a game processing in the roulette gaming machine according to the present embodiment.
Figure 12:
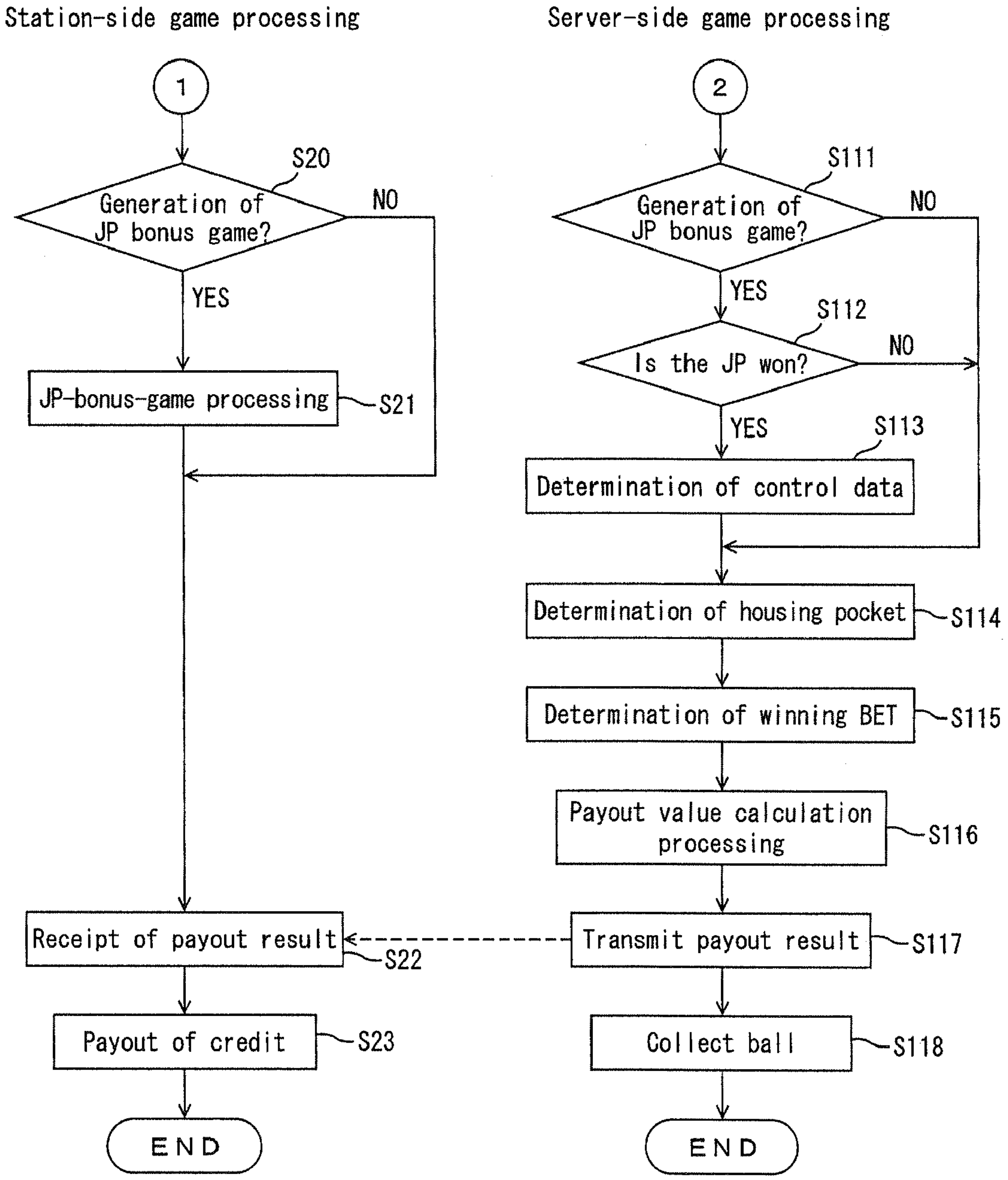
FIG. 12 is a flow chart illustrating a game processing in the roulette gaming machine according to the present embodiment.

Hereinafter, based on FIG. 11 and FIG. 12, there will be described server-side game processing which is conducted by the server-controlling CPU 81 included in the roulette gaming machine 1 according to the present embodiment, and station-side game processing which is conducted by the station-controlling CPU 91. FIG. 11 and FIG. 12 are flow charts illustrating game processing in the roulette gaming machine according to the present embodiment.

First, the station-side game processing will be described, based on FIG. 11 and FIG. 12.

At first, in step S11, the station-controlling CPU 91 determines whether or not medals or coins have been inserted by the player, based on detection signals from the medal sensor 97. If no medal or coin has been inserted (step S11: NO), the station-controlling CPU 91 waits for medals or coins to be inserted. On the other hand, if medals or coins have been inserted (step S11: YES), the processing proceeds to step S12.

In step S12, the station-controlling CPU 91 stores, in the RAM 93, an amount of credit data corresponding to the number of inserted medals or coins. Next, in step S13, the station-controlling CPU 91 transmits, to the server 13, a medal detection signal indicative of the presence of insertion of medals or coins.

Next, in step S14, the station-controlling CPU 91 causes the image display device 8 in the station 4 to display the BET screen 61 illustrated in FIG. 4.

Next, in step S15, the station-controlling CPU 91 starts measuring a betting time period during which the player can bet chips.

Then, the player taking part in the game can bet his or her own chips on a BET area 72 relating to a winning number that he or she predicts, by operating the touch panel 50, during the betting time period during which betting can be received (see FIG. 4). Betting methods using the BET screen 61 have been already described in detail, and description thereof is not repeated.

Further, the player is allowed to take part in a game halfway therethrough after the start of the betting time period, and up to 12 players can play games with the roulette gaming machine 1 according to the present embodiment. Further, in cases where a current game is played subsequently to the previous game, the reception of betting operations is started immediately after the end of the previous game.

Next, in step S16, on receiving a betting-time-period end signal indicative of the end of the betting time period from the server-controlling CPU 81, the station-controlling CPU 91 causes the image display device 8 in the station 4 to display an image indicative of the end of the betting time period, and ends the reception of betting operations through the touch panel 50 (step S17). Thereafter, the station-controlling CPU 91 transmits information on the betting that the player performed at the station 4 (the specified BET area 72, the number of chips betted on the specified BET area 72 [i.e., the number of BETs]) (step S18).

Next, in step S19, the station-controlling CPU 91 receives, from the server 13, the result of JP-bonus-game determination processing conducted by the server-controlling CPU 81, which will be described later. The result of JP-bonus-game determination includes the result of determination as to whether or not a predetermined JP bonus game should be generated at each station 4, the result of determination as to which station 4 out of the 12 stations 4 should win a JP (or as to whether all the stations 4 should not win the JP) if a JP bonus game should be generated, the result of determination as to which JP ("MEGA", "MAJOR" or "MINI") should be generated if a JP should be generated, and the like.

Next, in step S20 in FIG. 12, the station-controlling CPU 91 determines whether or not a JP bonus game should be generated, based on the result of the JP-bonus-game determination processing which was received in step S19. If the station-controlling CPU 91 determines that a JP bonus game should be generated at this station 4, the station-controlling CPU 91 executes a predetermined selectable JP bonus game relating to acquisition of JPs and causes the image display device 8 to display the result of the game (i.e., whether or not a JP was acquired), based on the result of determination received in step S19.

If the station-controlling CPU 91 determines in step S20 that no bonus game should be generated at this station 4, or after the processing in step S21, the station-controlling CPU 91 receives the result of credit payout transmitted from the server-controlling CPU 81 (step S22). The result of credit payout is constituted by the result of payout in games and the result of JP payout in JP bonus games.

Next, in step S23, the station-controlling CPU 91 pays out credits, based on the result of payout received in step S22. More specifically, the station-controlling CPU 91 stores, in the RAM 93, an amount of credit data corresponding to the payout value of the game and, also, stores therein, an amount of credit data corresponding to the JP payout value accumulated until the present time in cases where a JP bonus game was generated and the present station 4 won a JP. Then, if the payback button 48 is pushed, a number of medals corresponding to the number of credits currently stored in the RAM 93 (a single medal corresponds to a single credit, in general) are paid out from the medal payout port 9.

If a game is continuously played at one of the stations 4 thereafter, the processing returns to step S14, then starts the betting time period again and enters the next game.

On the other hand, if the game is ended at all the stations 4, the game processing ends.

Next, based on FIG. 11 and FIG. 12, the server-side game processing will be described.

At first, in step S101, the server-controlling CPU 81 determines whether or not medals or coins have been inserted by the player, on receiving medal detection signals transmitted from the station-controlling CPU 91. In the roulette gaming machine 1 according to the present embodiment, if medals or coins are inserted at one of the stations 4, the station-controlling CPU 91 in the station 4 at which the medals or coins have been inserted transmits a medal detection signal to the server-controlling CPU 81.

Next, the server-controlling CPU 81 starts measurement of a betting time period, at the time point when the player who first takes part in the game inserts medals or coins (step S102). The betting time period is a time period during which players can perform inputs for betting. Players taking part in the game can bet their own chips on BET areas 72 relating to winning numbers they predict, by operating the touch panel 50 during the betting time period.

Next, in step S103, the server-controlling CPU 81 determines whether or not the remaining betting time period has reached 5 seconds. Further, the remaining betting time period is displayed to the BET time display portion 69 (see FIG. 4). If it is determined that the remaining betting time period has not reached 5 seconds, the processing is returned to step S103. On the other hand, if it is determined that the remaining betting time period has reached 5 seconds, the processing shifts to step S104.

In step S104, the server-controlling CPU 81 transmits a control signal for starting an operation of the roulette device 3, to the CPU 101 in the roulette device 3. The CPU 101, on receiving the control signal, refers to the control data stored in the ROM 102 and controls operations as follows.

First, the CPU 101 drives the wheel-driving motor 106 to rotate the roulette wheel 22, only during a motor driving time defined by the control data.

Then, after the elapse of a predetermined time period (for example, 20 seconds) since the start of the rotation of the roulette wheel 22, the CPU 101 throws the ball 27 after the elapse of a launching delay time since it detected a detection signal from the pocket position detection circuit 107. At this time, the ball is thrown at an initial speed defined by the control data.

As control data to be referred by the CPU 101, single control data has been pre-set as a reference target, at the time of activation of the roulette gaming machine 1. Further, when another control data is set as the reference target, this another control data is referred to as the reference target by the CPU 101.

Next, in step S105, the server-controlling CPU 81 determines whether or not the betting time period has ended. If the server-controlling CPU 81 determines that the betting time period has not ended, it waits for the end of the betting time period.

On the other hand, if the server-controlling CPU 81 determines that the betting time period has ended, the server-controlling CPU 81 transmits a betting-time-period end signal indicative of the end of the betting time period, to the station-controlling CPU 91 (step S106).

Next, in step S107, the server-controlling CPU 81 receives, from the station-controlling CPU 91, information on the betting that the player performed at each station 4 (i.e., information on the specified BET area 72, the number of chips betted on the specified BET area 72 [i.e., the number of BETs], and the betting method) and stores it in the BET information storage area 83A in the RAM 83.

Next, in step S108, the server-controlling CPU 81 cumulatively adds a number of credits corresponding to 0.30% of the sum of the credits betted at all the stations 4, which were received in step S107, to the JP value stored in the "MINI" JP cumulative storage area 83C in the RAM 83. Further, the server-controlling CPU 81 cumulatively adds a number of credits corresponding to 0.20% of the sum of the credits to the JP value stored in the "MAJOR" JP cumulative storage area 83D in the RAM 83. Further, the server-controlling CPU 81 cumulatively adds a number of credits corresponding to 0.15% of the sum of the credits to the JP value stored in the "MEGA" JP cumulative storage area 83E in the RAM 83. Further, based on these JP values, the server-controlling CPU 81 updates the displays to the JP-value display portion 15, the MEGA display portion 73, the MAJOR display portion 74 and the MINI display portion 75.

Next, in step S109, the server-controlling CPU 81 conducts JP-bonus-game determination processing. In this processing, using random numbers sampled by a sampling circuit and the like, the server-controlling CPU 81 determines whether or not a JP bonus game should be generated at each station 4, determines which station 4 out of the 12 stations 4 should win a JP (or whether all the stations 4 should not win a JP) if a JP bonus game should be generated, and also determines which JP ("MEGA", "MAJOR" or "MINI") should occur if a JP should be generated.

In the present embodiment, the JP-bonus-game determination processing is executed after the JP accumulation processing. However, in the present invention, the timing for determining to generate a bonus is not limited to this example. For example, the determination may be made at the start of measurement of the betting time period, or at the start of control of the roulette operation. Alternatively, for example, the determination may be made at the receipt of betting information.

Next, at step S110, the server-controlling CPU 81 transmits the result of JP-bonus-game determination to each station 4, based on the processing in step S109.

Next, in step S111 in FIG. 12, the server-controlling CPU 81 determines whether or not it has been determined to generate the JP bonus game in the JP-bonus-game determination processing in step S109. When determining that it has not been determined to generate the JP bonus game, the server-controlling CPU 81 shifts the processing to step S114.

On the other hand, when determining that it has been determined to generate the JP bonus game, the server-controlling CPU 81 determines, in step S112, whether or not any of the JPs "MEGA" "MAJOR", and "MINI" has been won. When determining that none of the JPs has been won, the server-controlling CPU 81 shifts the processing to step S114.

On the other hand, when determining that any of the JPs has been won, the server-controlling CPU 81 determines control data in step S113.

Specifically, the server-controlling CPU 81 instructs the CPU 101 of the roulette device 3 to switch the control data. Upon receipt of this instruction, the CPU 101 performs random number sampling, and based on the acquired random number, the CPU 101 determines control data as the reference target, which is different from the control data currently set as the reference target, out of the plurality of control data stored in the ROM 102.

In the present embodiment, the processing for determining whether or not it has been determined to generate a JP bonus game, the processing for determining whether or not any of the JPs has been won, and the processing for determining control data (steps S111 to S113) are executed after transmission of the result of the JP-bonus-game determination. However, the present invention is not limited to this example. For example, the processing may be executed at execution of the JP-bonus-game determination processing, or at determination of a winning BET or at collection of balls that will be described later.

Next, in step S114, the server-controlling CPU 81 transmits a control signal to the roulette device 3 to drive the ball sensor 105, thereby determining which number is associated with the number pocket 23 in which the ball 27 has been housed.

Next, the server-controlling CPU 81 determines whether or not winning relating to the chips betted at each station 4 has occurred, from the betting information on each station 4 which was received in step S107 and the type of the pocket determined in step S114 (step S115).

Determining a BET placed by a player as a winning BET corresponds to offering a prize in the present invention.

Next, in step S116, the server-controlling CPU 81 conducts a payout value calculation processing. In the payout value calculation processing, the server-controlling CPU 81 recognizes the winning chips betted on the winning number at each station 4 and calculates the sum of the payout value of credits to be paid out for each station 4, using the payout value ratios for the respective BET areas 72 (i.e., the numbers of credits to be paid out for a single chip [1 BET]) stored in the payout value credit storage area 82A in the ROM 82.

Next, in step S117, the server-controlling CPU 81 conducts processing for transmitting the result of credit payout in games based on the payout value calculation processing in step S116 and the result of JP payout based on the JP-bonus-game determination processing in step S109. More specifically, the server-controlling CPU 81 issues credit data corresponding to the amount of payout values resulted from games to the station-controlling CPU 91 in the station 4 which won the games. Further, when a JP is generated, the server-controlling CPU 81 further issues credit data corresponding to the JP value accumulated until the present time.

Next, in step S118, the server-controlling CPU 81 transmits a control signal to the roulette device 3 to drive the ball collecting device 108 provided under the roulette wheel 22 for collecting the ball 27 thrown onto the roulette wheel 22. The collected ball 27 will be thrown into the roulette wheel 22 in the roulette device 3 again in subsequent games.

After executing the processing in step S118, the present subroutine is terminated.

As described above, the roulette gaming machine 1 according to the present embodiment includes the roulette wheel 22 including the plurality of number pockets 23 which have been associated with respective numbers in advance. Further, the roulette gaming machine 1 includes the ROM 102 (memory) which stores a plurality of control data for controlling the roulette gaming machine 1 so as to provide a higher weight on a probability that the ball 27 is housed in any of the number pockets 23 constituting a single area, the single area belonging to the plurality of areas (groups) each of which consists of 6 or 7 pockets of the number pockets 23, and the plurality of control data associated with each of the areas. Further, the roulette gaming machine 1 comprises the control portion 80 (controller), wherein the control portion 80 controls rotation of the roulette wheel 22 and launching of the ball 27 by referring to a single control data out of the plurality of control data. Also, the server-controlling portion 80 determines a number corresponding to a number pocket 23 with a ball 27 housed therein as a winning number, and determines whether or not to determine a BET placed by a player as a winning BET (whether or not to offer a prize) based on the determined winning number and the BET placed by the player. Moreover, the server-controlling portion 80 selects another control data different from the single control data, out of the plurality of control data, and sets the selected control data as a reference target, when determining to generate a JP bonus game (predetermined bonus) and a JP is won.

In the present embodiment, the control data is changed when a JP bonus game is generated and a JP is won. However, the present invention is not limited to this example. For example, the control data may be changed when a JP bonus game is generated regardless of whether or not a JP is to be won.

In the present embodiment, the control data is changed when any of the JPs "MEGA", "MAJOR" and "MINI" is won. However, the present invention is not limited to this example. For example, the control data may be changed only when a predetermined single JP is won, e.g., the control data is changed when the JP for "MINI" is won and the control data is not changed when a JP other than the JP for "MINI" is won.

Further, in the present embodiment, there are provided three types of JPs, "MEGA", "MAJOR", and "MINI". However, there may be equal to or less than two types of JPs, or equal to or more than four types of JPs.

Furthermore, in the present embodiment, a case has been described where the predetermined bonus in the present invention is a JP bonus game. However, the predetermined bonus in the present invention is not particularly limited so long as the bonus is to be generated apart from a prize offered in a game determining whether or not offering the prize based on a winning number and a BET placed by a player.

The predetermined bonus in the present invention may be, as in the present embodiment, the one executing a payout of a currency value. The currency value may be always paid out, or may not be paid out in some cases.

The bonus always paying out the currency value may be exemplified by a bonus always paying out a credit according to a result of a game in a second game where an image of a slot machine or roulette is displayed to an image display device. Also, for example, the bonus always paying out the currency value may be only paying out a predetermined value of credit without executing any additional game.

Further, the bonus not paying out the currency value in some cases may be exemplified by a bonus being controlled so as to not paying out a credit in a case of losing in a second game where determining winning or losing.

The above-mentioned game may proceed according to an operation input from a player, or may proceed without an operation input from a player.

Moreover, the predetermined bonus in the present invention may be the one other than paying out the currency value. Such a bonus may be exemplified by displaying an image with high scarcity value (e.g. image concerning a winning strategy in a game), and producing an effect by music, effective sound or illumination.

The gaming apparatus in the present invention may be configured to control so as not to generate a bonus when a BET placed by a player is determined as a winning BET in a game determining whether or not to offer a prize based on the winning number and the BET placed by a player.

Although the present invention has been described with reference to embodiments thereof, these embodiments merely illustrate concrete examples, not restrict the present invention. The concrete structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there have been described processes to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming apparatus comprising:

a roulette wheel including a plurality of pockets associated with respective numbers in advance;

a memory for storing a plurality of control data for controlling the gaming apparatus so as to provide different weights on probabilities that a ball is housed in each of said pockets; and a controller, said controller controlling rotation of said roulette wheel and launching of said ball by referring to a single control data out of said control data, determining a number corresponding to one of said pockets with said ball housed therein as a winning number, determining whether or not to offer a prize based on the determined winning number and a BET placed by a player, determining whether or not to generate a predetermined bonus different from said prize, and selecting another control data different from said single control data, out of said plurality of control data, and setting the selected control data as a reference target, when determining that the predetermined bonus different from said prize is to be generated.

2. A gaming apparatus comprising:

a roulette wheel including a plurality of pockets associated with respective numbers in advance;

a memory for storing a plurality of control data for controlling the gaming apparatus so as to provide a relatively high weight on a probability that a ball is housed in any of the pockets constituting a single group, said single group belonging to a plurality of groups each of which consists of a predetermined number of said plurality of pockets, and the plurality of control data associated with each of said groups; and a controller, said controller controlling rotation of said roulette wheel and launching of said ball by referring to a single control data out of said control data, determining a number corresponding to one of said pockets with said ball housed therein as a winning number, determining whether or not to offer a prize based on the determined winning number and a BET placed by a player, determining whether or not to generate a predetermined bonus different from said prize, and selecting another control data different from said single control data, out of said plurality of control data, and setting the selected control data as a reference target, when determining that the predetermined bonus different from said prize is to be generated.

3. A playing method of a gaming apparatus comprising the steps of:

controlling rotation of a roulette wheel and launching of a ball by referring to a single control data, the single control data selected out of a plurality of control data for controlling the gaming apparatus so as to provide different weights on probabilities that said ball is housed in any of a plurality of pockets included in said roulette wheel and associated with respective numbers in advance;

determining a number corresponding to one of said pockets with said ball housed therein as a winning number;

determining whether or not to offer a prize based on the determined winning number and a BET placed by a player;

determining whether or not to generate a predetermined bonus different from said prize; and selecting another control data different from said single control data, out of said plurality of control data, and setting the selected control data as a reference target, when determining that the predetermined bonus different from said prize is to be generated.

4. A playing method of a gaming apparatus comprising the steps of:

controlling rotation of a roulette wheel and launching of a ball by referring to a single control data, the single control data selected out of a plurality of control data for controlling the gaming apparatus so as to provide a relatively high weight on a probability that said ball is housed in any of the pockets constituting a single group, said single group belonging to a plurality of groups each of which consists of a predetermined number of pockets out of a plurality of pockets being included in said roulette wheel and being associated with respective numbers in advance;

determining a number corresponding to one of said pockets with said ball housed therein as a winning number;

determining whether or not to offer a prize based on the determined winning number and a BET placed by a player;

determining whether or not to generate a predetermined bonus different from said prize; and selecting another control data different from said single control data, out of said plurality of control data, and setting the selected control data as a reference target, when determining that the predetermined bonus different from said prize is to be generated.

* * * * *